June 24, 1969 WILLIAM KE-CHIN YUAN ET AL 3,452,157

CURRENT CONTROLLED, SELF-SEEKING TELEPHONE SWITCHING SYSTEM

Filed Feb. 1, 1966 Sheet 1 of 3

INVENTOR
W.K.C.YUAN - J.G.FRISBIE
BY J.G.BULL
ATTORNEY

United States Patent Office 3,452,157
Patented June 24, 1969

3,452,157
CURRENT CONTROLLED, SELF-SEEKING TELEPHONE SWITCHING SYSTEM

William Ke-Chin Yuan, Ridgewood, and Jack Gene Frisbie, Washington Township, N.J., and James George Bull, Markham, Ill., assignors to International Telephone and Telegraph Corporation Filed Feb. 1, 1966, Ser. No. 523,999
Int. Cl. H04m 3/38
U.S. Cl. 179—18 8 Claims

ABSTRACT OF THE DISCLOSURE

In a current-controlled, self-seeking telephone switching system, means for simultaneously applying the end-marking potential to the prewired configuration of enabling connections and to the end-marking of the network whereby the enabling potential is applied to the prewired configuration of enabling connections only when a switch path is actually being requested.

This invention relates to electronic switching systems and more particularly to speech path controllers for current controlled self-seeking matrices for use in such systems. This invention is an improvement over U.S. Patent 3,204,044 entitled, "Electronic Switching Telephone System," granted Aug. 31, 1965 to V. E. Porter, and over U.S. Patent 3,221,104 also entitled, "Electronic Switching Telephone System," granted Nov. 30, 1965, to E. G. Platt et al. both of these patents being assigned to the assignee of the present invention.

A current controlled, self-seeking network does not require complex and expensive circuitry to control the selecting of switching paths and to supervise electronic crosspoints. Instead, the network relies upon the characteristics of electronically controlled switching devices, wherein a self-seeking circuit interconnects two network points via a path which includes randomly selected crosspoints (such as PNPN diodes) in cascaded switching matrices.

These crosspoints are arranged in horizontal and vertical multiples, with the verticals of one multiple connected to the horizontals of the next succeeding multiples, to provide switching matrices which may be cascaded to form a multistage switching network. When preselected multiples are marked simultaneously at a network inlet and outlet, electronic devices at associated idle crosspoints fire in a random manner. When the first path is completed through the network, current flows thereover to hold the diodes in the completed path on an on condition. All completing paths are self-releasing or self-blocking, depending upon such current flow. Thus, connections are completed over self-seeking paths via randomly selected crosspoints with virtually no supervision or control equipment required.

The term "random" is used above to describe a process wherein crosspoints switch "on" and "off" at the mercy of chance. Thus, the paths which race through randomly selected crosspoints are guided only by the natural selection caused by minute variations of component and circuit characteristics, by the variations of any existing charges, stray currents or potentials and by prior traffic conditions.

The Platt et al. patent describes an improvement over the Porter patent. Platt et al. continue to provide for a completely random selection of crosspoint switches. However, they provide a prewired configuration of gates which enabled useful while inhibiting useless searching. This gating system guides switching paths to a degree without requiring expensive markers, computers, or the like, for selecting a specific path through the network. Thus, the switching network continues to have self-selecting crosspoints which do not require expensive control circuitry. In greater detail, Platt et al. also provide the electronic switching network of intersecting multiples which are electrically joined when the associated crosspoint diodes are switched "on" and electrically isolated when the diodes are switched "off."

Again, a switching search is made over a plurality of self-seeking paths extended through the cascaded matrices via randomly selected crosspoints. Before Platt et al. many of the self-seeking paths which were explored did not extend to the second marked multiples, but were dead-end paths with respect to certain predetermined end-markings. Therefore, Platt et al. inhibited all of the dead-end paths to preclude useless searching. This inhibition resulted from the circuit configuration of a prewired pattern of connections extending from circuits at the destinations of the self-seeking paths to various multiples in the matrix.

The term "inhibiting," of course, refers to the blocking of a connection. One could just as well take an opposite view and use the term "allotting" or "enabling" to refer to the enabling of a connection. One term is the negative of the other; the circuit effect is the same, at least as used herein.

The circuit shown in the Platt et al. patent suffers somewhat because the continued application and removal of the enable voltages at all stages in the network tends to introduce noise into the system. In extreme cases, it is conceivable that these voltages could cause unpredictable establishment or release of a switch path at the worst, and an undue amount of noise at the best.

Accordingly, an object of this invention is to provide a new and improved control over a self-seeking matrix without introducing in-network controls which required marker-like decision making circuits. A further object of the invention is to provide a new and improved network which retains the advantages of random crosspoint selection without allowing a search over the self-seeking paths which do not extend to the second end-marking, but which are dead-end paths with respect to that end-marking. Therefore, stated in another manner, an object of the invention is to inhibit all of the dead-end paths to preclude useless searching. A further object is to provide this inhibition or enablement from a prewired pattern of connections extending from circuits at the destinations of the self-seeking paths to various multiples in the matrix without introducing any substantial amount of noise.

In accordance with one aspect of this invention, a stage in the network is connected via a prewired pattern of diodes to the individual control links at the end of the network. When a link is ready to complete a connection through the network, it will apply an end-marking to the speech path and simultaneously apply an enabling marking to the diode network. The prewired configuration of the diode network is such that the only paths which may be explored during the self-seeking search are those which lead to the end-marking. All dead-end paths not leading to the end-marking are inhibited. The application of the enable marking and prewired configuration is such that a minimum voltage is applied to a minimum number of multiples in the network. This way, the noise resulting from an insertion of the enabling voltage is reduced to an extremely low level which cannot cause any undesired circuit responses.

The above mentioned and other features and objects of this invention and the manner of obtaining them will become more apparent, and the invention itself will be best understood by making reference to the following description of an embodiment of the invention taken in conjunction with the accompanying drawings where:

Figure 1:
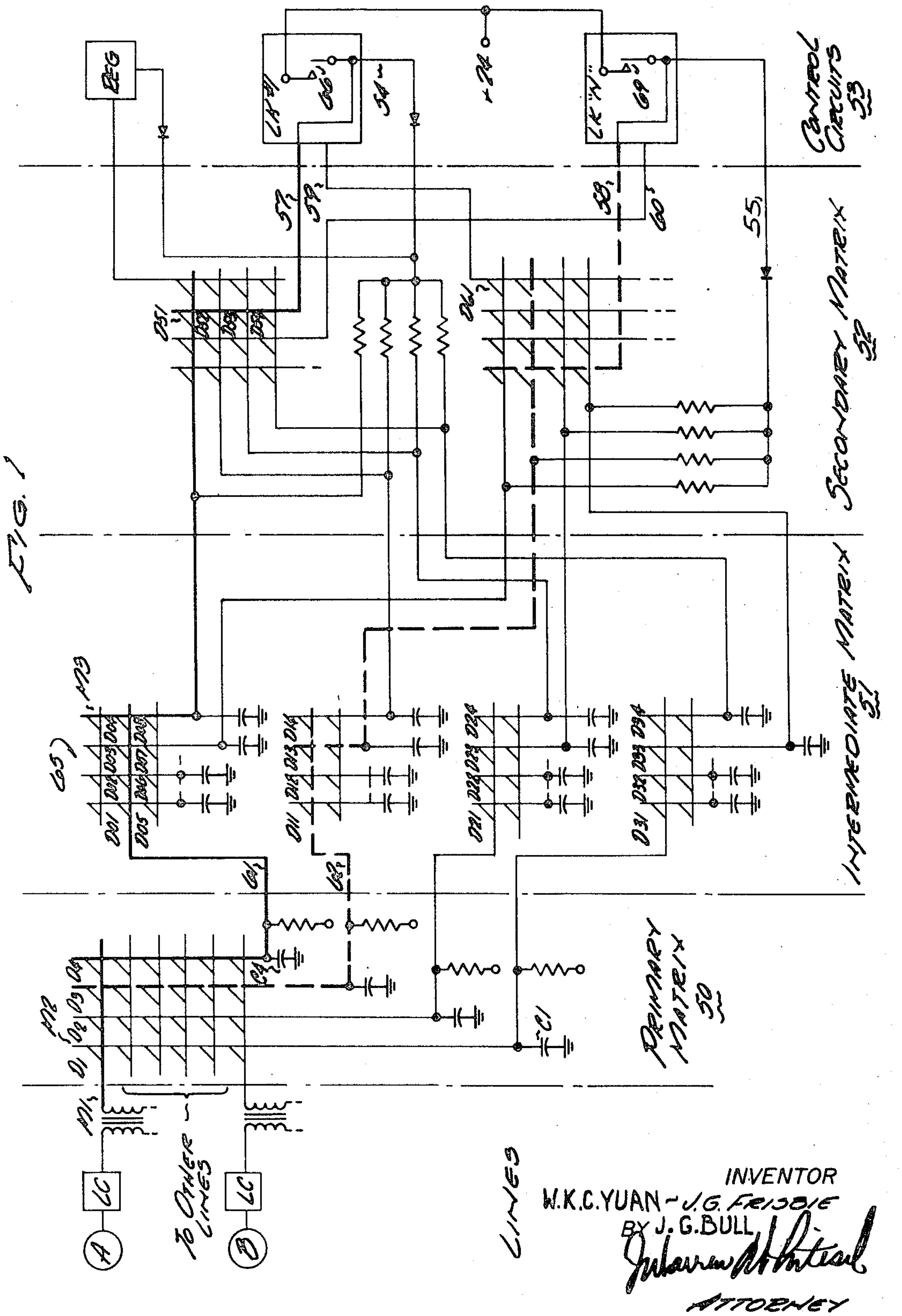
FIG. 1 is a schematic circuit diagram which shows a cascaded series of electronic switching matrices.

FIGURE 1 shows a plurality of cascaded matrices or switching arrays arranged to give automatic telephone switching service. The figure includes two exemplary subscriber lines A, B connected to the inlets of a primary matrix. Any number of line groups or primary matrices may, of course, be added. Also, the groups may be enlarged or reduced in size to include a greater or lesser number of lines.

Three cascaded stages of switching matrices or switching arrays 50–52 are herein designated "primary," "intermediate," and "secondary." The switching technique applies equally well, however, to any convenient number of switching stages. Moreover, any suitable number of vertical and horizontal busses may be provided in any given matrix. A number of link, register, or other control circuits 53 control the calls which are extended through the network and provide necessary or desirable call functions such as: dial tone, busy tone, conversation timing, or the like. A number of busses 54, 55 interconnect the links and matrices to transmit matrix inhibit or enabling signals.

To request a switching path through this network of cascaded matrices, one end of the desired path is marked from a subscriber line, and the other end is marked from an allotted link circuit. For example, a calling subscriber at station A may remove a receiver or handset from a hook switch and cause an associated line circuit LC to mark horizontal multiple M1. A control circuit may be allotted so that a switch path will be extended through the network in a one-way direction to the link (i.e., the path extends from the lines toward the control circuits and vice versa).

Each matrix includes first and second (or horizontal and vertical) multiples, two of which are shown at M1, M2 respectively. These multiples (which may be conductor busses) are arranged to provide a number of intersecting crosspoints. Diodes, one of which is shown at D1, are connected across each crosspoint. These diodes are any suitable electronic switch such as PNPN diodes, for example. Thus, when the switch is turned "on," the intersecting multiples are electrically connected, and when the switch is turned "off," the intersecting multiples are electrically isolated from each other.

These electronic switches turn "on" or fire when a voltage in excess of a "firing" potential is applied across their terminals. In greater detail, the vertical multiples are biased through an RC network by a first or common reference potential E1. Therefore, a crosspoint diode switch fires when a horizontal multiple is marked by a second potential which exceeds a firing potential relative to the vertical marking E1. After a crosspoint fires, the marking potential on the horizontal multiple charges a capacitor, such as C1, connected to the intersecting vertical multiple. When the capacitor charges sufficiently, a firing voltage appears on a horizontal multiple of the next cascaded matrix. Thus, the marking potential is passed on step-by-step to each succeeding cascaded matrix where diodes fire in a similar manner.

Actually, the marked horizontal multiple will have many intersecting vertical multiples (as exemplified by the diode points D1–D4 in the primary matrix of FIG. 1). Thus, if all vertical multiples are marked by a common reference potential, all diodes connected to the marked horizontal multiple K1 should theoretically fire simultaneously. This pre-supposes, however, that all diodes have exactly the same characteristics; a fact which in reality is almost never so. Actually one diode will almost certainly fire first. Then, the common reference potential E1 on the vertical multiple lowers the marking potential on the horizontal multiple while the capacitor (such as C1) charges. This lowered potential prevents other diodes connected to the horizontal multiple from firing until after the fired diode turns off.

The end-marking is a firing pulse which provides a charging current through the fired diode to the capacitor C1. This current holds the diode "on." If, before the capacitor C1 charges, the charging current is replaced by a holding current over a completed path from a subscriber line to an allotted link, the fired diode stays "on." If not, after the capacitor C1 charges, the diode starves for want of current and switches "off." This is due to PNPN diode characteristics. After the diode switches "off," the potential on the charge capacitor C1 is a reverse bias potential which holds that diode "off" momentarily to allow another diode (such as D2) connected to the end-marked horizontal multiple M1 to switch "on." Thus, diodes switch "on" and "off" in a random manner until a "self-seeking path finds its way through the cascaded matrices; all of this is explained in detail in the Porter patent.

Upon reflection, it will be apparent that the self-seeking path may include many combinations of diodes scattered throughout the cascaded matrices. In view of the randomness of the diode selection, many diode firings will be in useless dead-end paths with respect to the two marked end-points and a few other diode firings will be in useful paths which actually do extend between these end-marked points.

In greater detail, by an inspection of the drawings it will be seen that each subscriber line (such as A, B) connects to a horizontal multiple in a primary matrix 50. For example, line A connects to multiple M1. Each vertical multiple in a primary matrix connects to a horizontal multiple in an intermediate matrix, and each vertical multiple in the intermediate matrices connects to the horizontal multiple of a secondary matrix. Some vertical multiples in the secondary matrix connect to link inputs 57, 58 and others to the link outputs 59, 60. By inspection, it will be seen that the lines have access to link #1 via certain paths such as that shown by a heavily inked, solid line 61 and to link N via other paths such as that shown by a heavily inked, dashed line switch path 62. Thus, switch path 61 is a dead-end path for calls from the lines to link N and switch path 62 is a dead-end path for calls from the lines to link #1.

Means are provided for inhibiting the search over all dead-end switching paths while enabling a search over all switching paths which may be completed between the two end-marked switching points. This inhibiting and enabling function is accomplished under the control of the link or register pre-selected by an allotter or scanner to complete the next call. However, as will become more apparent, the inhibiting or enabling pattern results from a pattern of wiring connections made in the factory at the time when the switching system is built. There is no need for a decision making circuit, such as a marker or computer. Therefore, expensive control circuits are not required, and the advantages of extending self-seeking paths through randomly selected crosspoints is preserved.

Next, it may be helpful to an understanding of the invention to explain why and how the enable or inhibit pre-wired pattern of busses is used. For this explanation, reference is made to FIGS. 2, 3, 4 which are fragments and equivalents of FIG. 1. The same reference characters are used to identify the same parts in all figures so that they may be related to each other more easily.

Figures 2, 3:
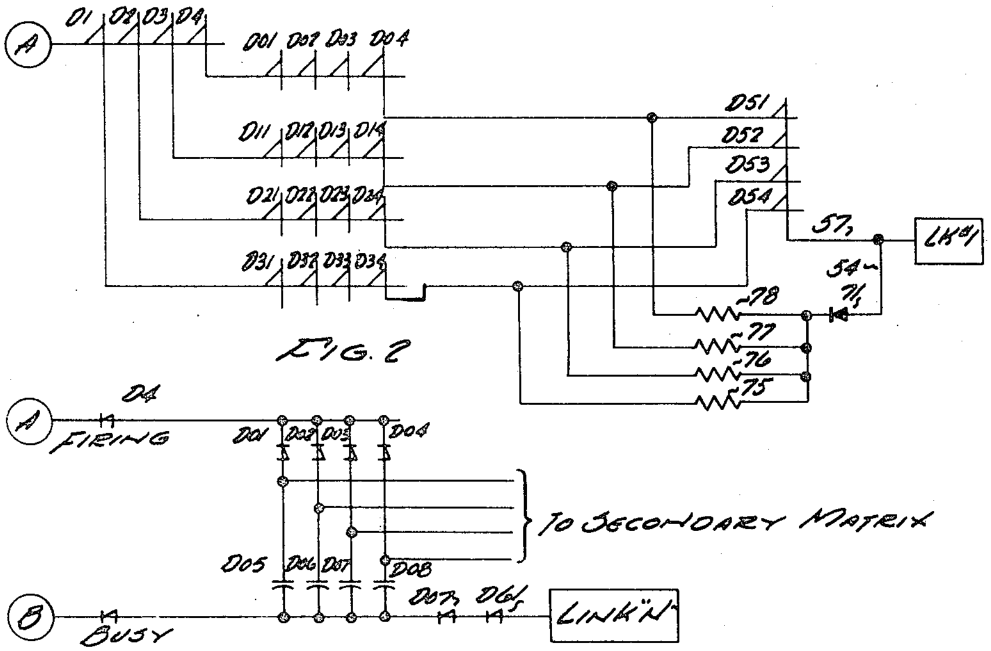
FIG. 2 is a redrawn portion of FIG. 1 showing only the useful paths, and parallel unused diodes, which exist between two end-marked network points.
FIG. 3 is a redrawing of FIG. 2 showing capacitance equivalents for the unused diodes.

FIG. 2 shows all possible paths from the end-point station A to the end-point link #1 which exist in the particular matrix configuration that is disclosed in FIG. 1. In addition, FIG. 2 shows the parallel diodes which appear in unused paths, such as diodes D01–D03. Insofar as the possible paths are concerned, the teachings of the Porter patent may be followed, with all of the advantages of random firing, self-selection, etc. If the network is reduced to only the diodes D1, D2, D3, D4, D04, D14, D24, D34, and D51–D54, the operation will not change in any real manner with respect to these end-points. The firing of the diodes D01–D03, D11–D13, D21–D23, and D31–D33 does not enhance any aspects of a self-selecting network with respect to these end-points. Quite the contrary, firing these diodes is futile since they are not part of any possible path between station A and link #1.

Semiconductor devices typically exhibit a capacity characteristic of the junctions. Therefore, for present purposes, each diode which has not been fired may be shown as an equivalent capacitor. Hence, part of FIG. 1 has been redrawn in FIG. 3 to show the diodes D05–D08 as capacitors. Of course, a true equivalent circuit for these diodes would also include a diode, resistors, etc. However, they have been omitted for simplicity and clarity.

Figure 4:
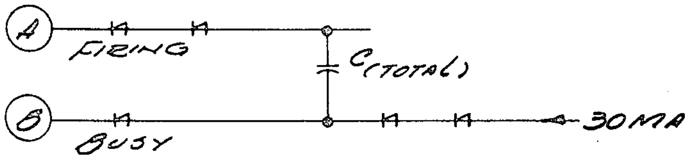
FIG. 4 is a further redrawing showing all circuit and stray capacitances as a single lumped equivalent.

FIG. 3 shows the network conditions at an instant when a hypothetical busy path has already been established from station B to link N. It is irrelevant as to when the busy path was set up. Because the path is busy, it is drawing some current to hold the fired diodes in their on condition. Therefore, yet another equivalent circuit FIG. 4 is drawn with an arrow marked "30 ma." to show that the link is supplying 30 milliamperes of current (there is no particular significance to this 30 ma. figure except that it is within a typical range which might reasonably be expected).

At the instant portrayed by FIG. 3, a firing pulse is in the process of extending a path from station A toward an allotted link #1. If the pulse fires the diodes D01, D02, and D04, there will be a current flow through the diode capacitances D05, D06, and D08. There is no firing of the diode D03 since it is connected to a vertical bus made busy by the fired diode D07. Upon reflection, it should be apparent that the path from station A has drawn two-thirds more current from the busy path than it should have drawn because the firing of diodes D01, D02 was a useless act. If these diodes had not fired, the path firing from station A would have remained isolated from the busy path except for the capacitive coupling via the single, useful firing of diode D04 and the resulting momentary current through the capacitance of the diode D08.

There are no cross-talk problems resulting from current through diode D08 because the operators are at electronic speeds and the current is a spike-form pulse which lasts for only a few micro-seconds. It has been found that the "noise" created by the current spike was more than 40 db down from the conversation level, under the worst condition. Thus, for all practical problems, it does not exist.

The above analysis has considered only the diode capacitance. These are other capacitances which result from cables, especially shielded cables, stray currents, etc. Therefore, it is possible to redraw FIG. 3 as FIG. 4 and to lump all capacitances to become one equivalent capacitance C (total). Having noted the existence of other capacitances, this description will continue by talking about only the diode capacitances because this will highlight the problem. The introduction of other capacitive sinks merely goes to the degree of the problem and does not change the principle.

Figure 5:
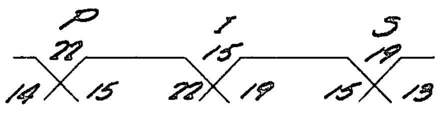
FIG. 5 is a graphical representation of a network, showing the distribution of diodes, and matrices therein.

FIG. 5 symbolically shows a hypothetical matrix of the type shown in FIG. 1. This figure may be interpreted in the following manner. The primary stage "P" has 22 matrices each of which has 14 inlets and 15 outlets. The intermediate stage "I" has 15 matrices, each of which has 22 inlets and 19 outlets. The secondary stage has 19 matrices, each of which has 15 inlets and 13 outlets. This matrix is selected to illustrate the problem—there is no representation that the matrices should be this big. Traffic studies will indicate the required number and size of the matrices, and the number of switching paths required. Again, the point is that a first plurality of possible paths may be extended between any two points and a second plurality of paths are dead-end with regard to the same two points. In this hypothetical matrix 18 of the 19 intermediate matrix diodes are useless current sinks for extracting holding current from a busy path.

The general rule is that the current ($i$) through the capacitance (C) is:

$$i=C\frac{dv}{dt} \qquad (1)$$

Since there are 19 intermediate outlets there are 19 diodes connected to every horizontal. The worst case is when only one outlet is busy and all 18 diodes fire. A reasonable assumption is that the equivalent diode capacitance is 22 pf. and that the rate or slope of voltage change in the intermediate matrix may be in the range of 50 v./$\mu$s. to 300 v./$\mu$s. Ignoring all capacitances except the diode capacitance, the worst case total capacitance is $$18 \text{ diodes} \times 22 \text{ pf.} = 396 \text{ pf.}$$

Assuming a $$dv/dt=50 \text{ v.}/\mu\text{s.}$$

from Equation 1

$$i=396\times 50 \text{ v.}/\mu\text{s.}=19.8 \text{ ma.}$$

If 30 milliamperes of current flows through the busy path and the firing pulse draws 19.8 milliamperes through the diode capacitances, only 10.2 milliamperes remain to hold the path.

Next, assume a 100 v./$\mu$s. rise time for the voltage on the vertical bus and make the same calculations, $$i=396\times 100 \text{ v.}/\mu\text{s.}=39.6 \text{ ma.}$$

Since only 30 ma. of current flows through the busy path and the firing pulse is trying to extract 39.6 ma., there is a deficit of 9.6 ma. of current which will be drawn from any source that may be available.

Fortunately, the hypothetical problem here presented represents an extreme case which does not occur very often in a well designed system. First, the individual matrices do not need to be this big but may be configured as a large collection of smaller matrices. Second, the problem assumes the worst possible condition where all intermediate diodes fire in a manner which is such that the maximum possible current is drawn from the busy path. Third, the problem assumes that the duration of the maximum current exceeds the turn off time of the diodes in the busy path. All of these assumptions would not normally occur simultaneously and there are other factors which also tend to reduce the problem.

Nevertheless, the fact that the problem might exist is sufficient reason for providing a means for avoiding the condition.

In accordance with one aspect of this invention, a pre-wired configuration of enable circuits are connected from the end-marked point into the network to the useful paths with respect to those end-marked points. These connections provide a biasing condition wherein no diode ever has to drive into more than one other diode at any given stage. Of course, a number of diodes may be cascaded, with one diode per stage, to form the total switch path.

Figures 6, 10, 11, 12:
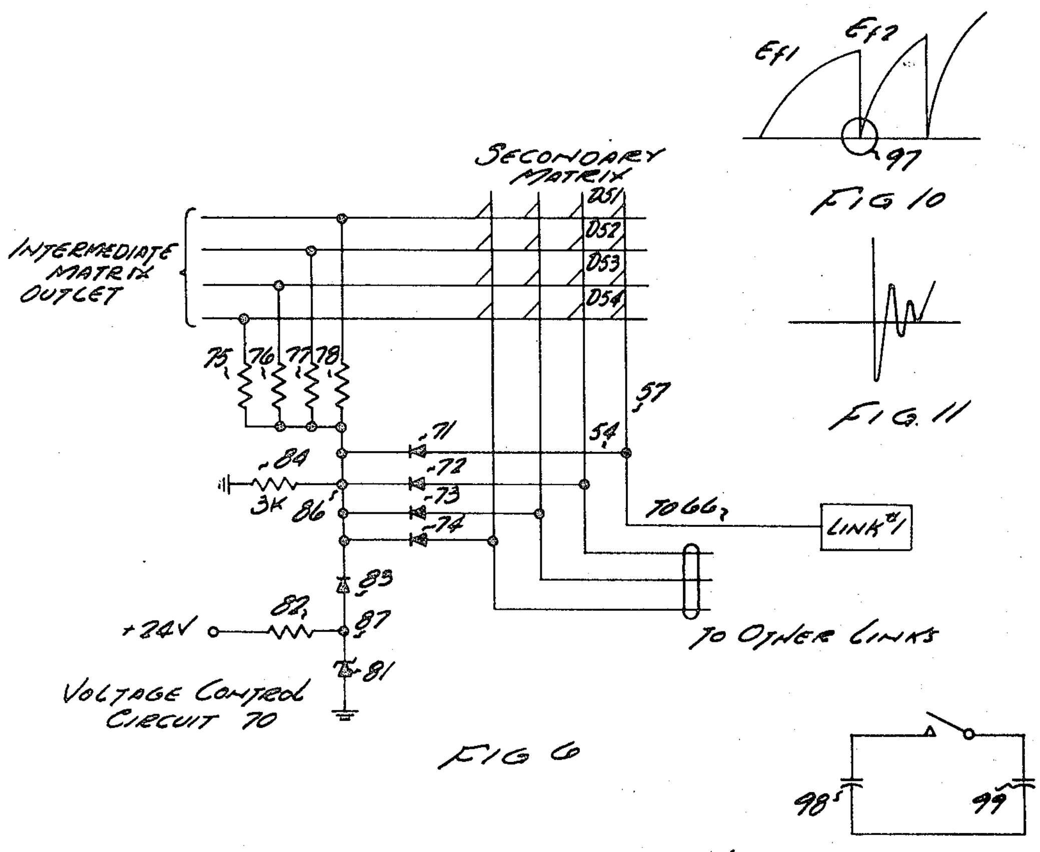
FIG. 6 shows a single matrix, at the terminating end of the network which incorporates the invention.
FIGS. 10–12 are wave forms and a simple circuit explaining the source of overshoot voltages.

In greater detail, the means for accomplishing this enabling function is shown in FIG. 6. Again FIG. 6 is a fragment of FIG. 1 with a voltage control circuit 70 added. The reference characters D51, D52, D53, D54 identify the same PNPN diodes in FIGS. 1 and 6. A conventional rectifying or isolating diode, such as 71–74, interconnect each link and every intermediate matrix outlet or secondary matrix inlet which represents a path that can be completed to link #1. A resistor 75–78 is interposed between each secondary outlet and the enabling diodes 71–74. These resistors are the vertical bus resistors used for applying biasing potential, as explained in the Porter patent. If no voltage is applied to the lower end of these resistors, it is not possible to fire any diode connected to the unmarked vertical bus.

It should now be obvious that no path may be completed through the intermediate matrix if the end-marking is not applied from the link to the vertical bus resistor. From FIG. 2, it is also obvious that only one PNPN diode D04, D14, D24, D34 is enabled in each intermediate matrix because only one PNPN diode is in the path from station A to link #1.

Means are provided for limiting the insertion noise resulting from the application of the enable potential. First, the end-marking is applied to the enable diode 71 only when an end-marking is also applied at point 57 to the matrix, and this occurs only when the call is being set up. There is no continuous switching off and on every time that a scanner scans a link. Second, the insertion noise on the busy line is only that caused by the insertion of the current drawn through a single diode. Thus, if link #1 is in a busy condition when another link applies a marking through the enable diode 72, for example, the only noise which could occur on the busy path would result from the capacity coupling through a single reverse biased diode. For example, in FIG. 3, if only the diode D04 is turned on during the search from station A, the noise inserted into the busy path to station B is limited to that caused by the current drawn through the diode capacity D08.

The voltage control circuit 70 (FIG. 6) includes a Zener diode 81, a Zener bias resistor 82, an isolation diode 83, and a bias control resistor 84. In the circuit which was constructed, each of the resistors 75–78 was 150K, the resistor 84 was 3K, and the resistor 82 was 1.8K. These circuit values are selected according to the following rules:

(1) The potential at point 86 must reverse bias all of the enable diodes 71–74 when an associated path is busy (i.e., one of the PNPN diodes D51–D54 is turned on).

(2) The Zener diode voltage, plus the voltage drop across diode 83 must not forward bias the diodes 71–74 when the A.C. voice signal takes the widest swing possible.

(3) The RC time constant established by an enabled resistor such as 78, and the total capacitance of all associated circuitry seen thereby shall be so related to the turn off time of the PNPN diodes that the time period while current is being drawn from an established path is too brief to turn off any PNPN diode.

(4) Any RC leakage resistance time constant shall be unimportant to holding the reverse bias on the enable diodes 71–74.

(5) Under the worst conditions, the Zener current flowing from the +24 volts source through the resistor 82 and Zener diode 81 shall have a level which is 150%–200% of the current required to hold the Zener diode in an on condition.

(6) Any other circuits connected to divide the voltage appearing at point 86 shall divide the voltages in a manner such that the reverse bias is not removed during the worst conditions. These rules for assigning the circuit values may be described in words.

The Zener diode 81 applies a well regulated and limited voltage at point 87 which is, say, (+)6.3 volts. The forward drop across an isolation diode 83 may be, say, .7 volt. Thus, the potential at point 86 is in the order of 5.6 volts. As long as the circuit is standing idle, there is no voltage change at point 86.

An end-marking for establishing the path is applied at 54, 57 as a potential which is much more positive than the +5.6 volts at the point 86. The marking at 54 is applied through the enable diode 71 and resistors 75–78 to bias the vertical busses which are connected to PNPN diodes in the useful paths through the intermediate stage.

After the path is completed and the end-markings are removed, the voltages which produce the holding current divide across the path in a manner which is such that the point 86 becomes and remains more negative than either the +6.3 Zener voltage or the holding voltage applied to the completed path—despite the widest A.C. swing that may be reasonably anticipated. The diode 83, therefore, isolates the vertical bus resistors 75–78 from the +6.3 volt, Zener diode controlled, power supply.

The enable diodes 71–74 are back biased to prevent crosstalk. Conversely stated, if the enable diode 71 were not back biased so that it could conduct the voice signal current from a path including link #1 and if the enable diode 72 were also allowed to conduct the voice signal current from another link, the resistor 84 would behave as a common load behaves. The two voice paths would then be effectively connected together and this cannot be allowed to happen.

Figure 7:
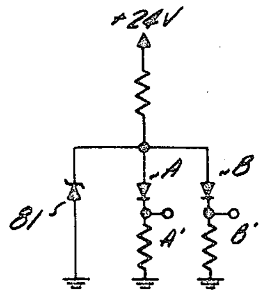
FIG. 7 is an equivalent of the power source circuit for FIG. 6 showing how enabling potentials are applied to the network.
Figure 8:
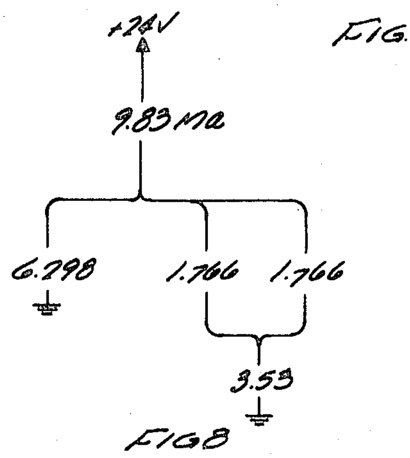
FIG. 8 is a current diagram showing the divisions of current in the equivalent circuit of FIG. 7.

FIG. 7 is an equivalent circuit which shows how the Zener controlled power supply may be connected to the network of enabling diodes. The Zener diode 81 is coupled to two sets of enable diodes, A, B. The diodes A and B are equivalent to the duplicate diodes 83. The terminals A′, B′ are equivalent to other duplicate sets of terminals 86. FIG. 8 shows how the current divides in the equivalent network of FIG. 7. A total of 9.83 flows through the resistor 82. This divides and 6.298 ma. flows through the Zener diode 81 and two streams of 1.766 ma. each or a total of 3.53 ma. flows through all of the enable diodes, such as 71–74. The Zener diode current is, therefore, about 200% of the required current, thereby meeting the above criterion (5) and allowing a great safety factor. With the described currents and resistor values, the voltage divisions will also meet the above criterion (6).

Figure 9:
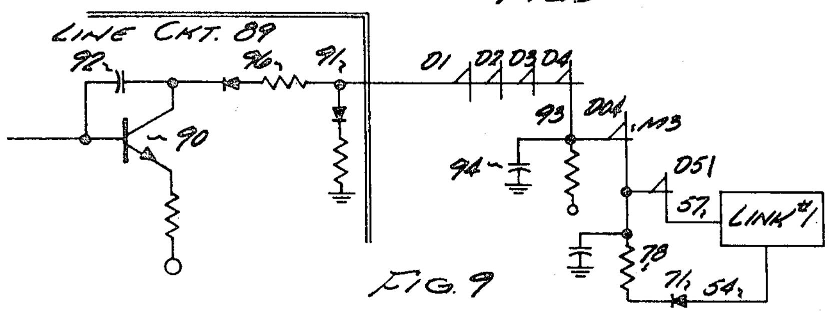
FIG. 9 is a single speech path taken from FIG. 1 to illustrate circuit operation and provide a basis for explaining the term diode "overshoot"

The network operation may be explained with the help of FIG. 9 which shows one useful path extending from a subscriber line circuit at 89 to a link circuit. When a path is requested, link #1 applies an end-marking to the point 57 and the enable marking to bus 54 at substantially the same time that the line circuit 89 applies the end-marking. That is, the transistor 90 turns on to apply a negative going end-marking to the network at the point 91, and the capacitor 92 slows the transistor response to slow the rise time of the applied end-marking voltage. As the voltage slowly rises at point 91, one of the primary matrix PNPN diodes D1–D4 will fire first because of the small differences between the individual PNPN diode characteristics. If diode D4 fires, the voltage at point 91 drops toward the voltage at point 93. The voltage at the point 93, in turn shoots up very fast toward the potential at 91. This rapidly rising voltage fires the enabled diode D04 on the "rate effect" or low voltage transient switching characteristics. Then, diode D51 will fire to complete the path if it is available. On the other hand, if it is not available because multiple M3 is marked busy by a fired diode D08 (FIG. 1), the PNPN diode D04 cannot fire.

When the capacitor 94 charges, diode D4 starves and turns off. Then the PNPN diode having the next lowest firing potential turns on as a result of the rising voltage being applied from the transistor 90. If diode D3 turns on, diode D14 (FIG. 1) will try to turn on.

In like manner, each of the diodes D1–D4 will turn on, one at a time, to explore all useful paths until the first available path is completed through the network.

Thus, the invention preserves the random searching described in the Porter patent and allows all possible paths to be explored. But, it limits the search to the useful paths.

The circuit value of the resistor 96 is selected to prevent PNPN diode overshoot when it turns on. In greater detail, consider the effect of a PNPN diode turning on. Before turn-on, the end-marking voltage applied at point 91 has risen slowly due to the delaying effect of capacitor 92. Thus, the curve of FIG. 10 is drawn to show that the voltage rises at some slope until it reaches the firing voltage $E_{f1}$ of the lowest firing voltage PNPN diode. Then, that diode fires and the voltage drops toward the idle bus potential as shown at 97 in FIG. 10. If the attempt is unsuccessful, the voltage from the source raises the potential on the vertical bus while the vertical bus capacitor 94 charges. Then, the first fired diode starves and switches off.

The end-marking voltage continues to rise until it reaches the firing voltage $E_{f2}$ and another PNPN diode fires.

If the voltage point shown in the circle 97 of FIG. 10 is enlarged greatly, it will not be the clean peaked curve shown in FIG. 10. Instead, the portion of the curve which is inside the circle will be somewhat in the nature of a damped oscillation, as shown in FIG. 11. The voltage drop below the axis may cause unwanted PNPN diode responses.

One way of viewing the overshoot shown in FIG. 11 is illustrated in FIG. 12. Operating a PNPN diode in a closed circuit including a number of capacitances is equivalent to closing a switch as shown in FIG. 12.

If the switch is initially open, energy may be stored on capacitor 98. Then, if the switch is closed, energy will be transferred from capacitor 98 to the capacitor 99, and the two charges on the two capacitors will be equal. The equation for transfer of energy in this circuit is $$E = \tfrac{1}{2}CV^2$$

Thus, during the transfer, the voltage moves with a wide swing to produce the overshoot.

Another way of viewing phenomenon is to consider the circuit of FIG. 12. The wire in FIG. 12 forms a single loop inductor of the tuned circuit including the capacitors 98, 99. Thus, the circuit behaves somewhat as a self-quenching oscillator when the switch closes.

From either viewpoint, the overshoot is probably aided by the slow response time of the transistor 90 as it is controlled by the effects of the capacitor 92. Since the transistor response is slowed, it will pour an extra large current through the fired PNPN diode for an instant after the diode turns on and before the charges can equalize. To preclude a PNPN diode overshoot when the diode turns on, a resistor 96 is included in series with the transistor 90 to limit the current. Another criterion for setting the value of this resistor is to select a value which will maximize the separation of diode characteristics normally appearing because of production tolerance limits, thereby tending to insure a separation of primary diode firings.

The foregoing description covers the aspects of the invention appearing in a preferred embodiment. In other embodiments, it may be desirable to trade off one circuit design parameter in order to gain an advantage from the use of another design parameter. In this event, a circuit designer may select PNPN diodes having reduced junction capacitances, as by devices having a smaller capacitance surface at the junctions of the conductive layers. Or the PNPN diode may be selected to have a longer turn off time relative to the time during which current flows through the total capacitance of FIG. 4. In another circuit, the designer may wish to control the rise time of voltages appearing on the vertical busses. The above calculations illustrate this by showing an exemplary increase of current requirement when the voltage rise time changes from 50 v./μs. to 100 v./μs. Still other parameter trade offs will occur to those skilled in the art.

The advantages of the invention should be apparent from a reading of the above disclosure. One advantage not mentioned before deals with the current requirements resulting from a fan-out of switched on diodes. The invention was not specifically designed to meet this particular type of fan-out problem; however, much literature has been written and patents have issued explaining and trying to avoid the adverse effect of fan-out in other end-marked systems. Therefore, it is worth noting that the present invention may be used to solve the problems caused by a fan-out of turned on diodes. In a well designed matrix, using the principles of the Porter patent, there is never a need for any diode to drive more than one other diode if this invention is used. In other end-marked networks designed to necessarily require a fan-out of simultaneous parallel firings, the number of parallel firings which are required may be sharply reduced if the principles of this invention are followed.

While the principles of the invention have been described above in connection with specific apparatus and applications, it is to be understood that this description is made only by way of example and not as a limitation on the scope of the invention.

We claim:

1. A self-seeking current controlled network comprising a plurality of parallel connected electronic switch means interconnected to form alternative paths through said network, some of said parallel paths being dead-end paths with respect to given end-points on said network, means for individually extending a plurality of self-seeking paths between end-marked points in said network whereby at any given instant some parallel paths are busy and other parallel paths are idle and available, means comprising a prewired pattern of selectively energized enabling connections for inhibiting the exploration of said dead-end paths when said end-markings are applied to said network, means for limiting the current drawn from said busy path when a connection extended through said network, means for simultaneously applying the same end-marking potential to said prewired pattern of enabling connections and to the end-marking of said network of electronic switches whereby the enabling potential is not applied to said pattern of enabling connections at any time except a time when a switch path is actually being requested, means associated with one end of said paths generating a firing pulse for said path, and resistive means interposed between said firing path and the end-marked point of said path for limiting current through said path.

2. The network of claim 1 wherein said means for limiting the current drawn from said busy path comprises means for limiting the total capacitance between any two of said parallel paths through said network.

3. The network of claim 1 wherein said means for limiting current comprises means for reducing the amount of current which is drawn from a busy path when a parallel path is fired through the network.

4. The network of claim 1 wherein said network comprises a plurality of cascaded matrices, each of said matrices having intersecting vertical and horizontal busses with electronic switches at each of the intersections, means for applying biasing potentials to said vertical busses to enable said switches to turn on when said end-marking appears on an intersecting horizontal multiple, and said pattern of connections including a plurality of enabling diodes connected between the inlets and outlets of the last matrix in said cascade.

5. The network of claim 4 and means for back biasing said enabling diodes when the path connected to be enabled by said diodes is busy to preclude cross-talk through said back biased diodes.

6. The network of claim 5 and means comprising a regulated voltage source for applying a forward bias to said enabling diodes, means responsive to the completion of a path for supplying a holding voltage across the ends of said completed path whereby said holding voltage divides itself across said path to provide busy potentials at any given point along the length of said path, the busy potential appearing at the inlets of the last matrix forming a reverse bias for said enable diodes relative to said regulated voltage.

7. The network of claim 1 and means comprising said pattern of connections for limiting the number of diodes being driven by each diode to the number one, said limitation being accomplished without reducing the effective self-seeking nature of said network.

8. A self-seeking current controlled network having a first plurality of crosspoint switching means for extending self-selecting paths between two end-marked points in the network, means comprising a plurality of enabling switches associated with said network as an integral part of the network for selectively enabling said self selecting crosspoints to select themselves, means for applying said end-markings simultaneously to said paths and to said enable switches, and means for completing said path through the points in said network where said enable switches and said crosspoint switches come together.

References Cited

UNITED STATES PATENTS

| | | | |
|---|---|---|---|
| 3,201,520 | 8/1965 | Bereznak | 179—18 |
| 3,204,044 | 8/1965 | Porter | 179—18 |
| 3,221,104 | 10/1965 | Platt et al. | 179—18 |
| 3,268,667 | 8/1966 | Arseneau | 179—18 |

KATHLEEN H. CLAFFY, *Primary Examiner.*

D. L. RAY, *Assistant Examiner.*